US008136969B2

(12) United States Patent
Burkett (10) Patent No.: US 8,136,969 B2
(45) Date of Patent: Mar. 20, 2012

(54) VARIABLE LIGHTING SYSTEM FOR OPTIMIZING NIGHT VISIBILITY

(76) Inventor: Karl A. Burkett, Austin, TX (US)

( * ) Notice: Subject to any disclaimer, the term of this patent is extended or adjusted under 35 U.S.C. 154(b) by 635 days.

(21) Appl. No.: 12/212,603

(22) Filed: Sep. 17, 2008

(65) Prior Publication Data

US 2009/0009089 A1 Jan. 8, 2009

Related U.S. Application Data

(63) Continuation-in-part of application No. 11/179,956, filed on Jul. 12, 2005, now abandoned.

(51) Int. Cl.
*B60Q 1/00* (2006.01)
*B60Q 3/00* (2006.01)
*H05B 37/02* (2006.01)

(52) U.S. Cl. ............... 362/459; 362/147; 362/153.1; 362/231; 362/464; 362/506; 315/77; 315/80; 315/82; 315/153; 315/169.3; 340/908.1; 340/958; 340/985; 340/815.4; 340/332

(58) Field of Classification Search ............ 315/77, 315/80, 82, 84, 153, 169.3, 200 A, 276, 291; 362/153.1, 147, 231, 459, 464, 506; 340/908.1, 340/958, 983, 985, 321, 331, 332, 815.4
See application file for complete search history.

(56) References Cited

U.S. PATENT DOCUMENTS

| 3,529,284 | A | * | 9/1970 | Villemain | 340/932 |
| 5,623,186 | A | * | 4/1997 | Archdekin | 315/276 |
| 5,673,039 | A | * | 9/1997 | Pietzsch et al. | 340/905 |
| 6,250,774 | B1 | * | 6/2001 | Begemann et al. | 362/231 |
| 7,025,525 | B2 | * | 4/2006 | Van Der Poel | 404/1 |
| 2008/0122607 | A1 | * | 5/2008 | Bradley | 340/468 |

* cited by examiner

*Primary Examiner* — Douglas W Owens
*Assistant Examiner* — Thai Pham
(74) *Attorney, Agent, or Firm* — Law Office of J. D. Pemberton; John Pemberton (57) ABSTRACT

A variable lighting system ("VLS") for optimizing object visibility at night by setting a base level of lighting, adding a variable light to that base level of lighting, and a synchronizing the timing and sequence of the base level of lighting and the variable lighting. The VLS varies the illumination by intensity, color, direction, or a combination thereof and optionally includes a detector for detecting motion, noise, and other occurrences. The VLS can be implemented as a fixed lighting source, a movable lighting source, or a vehicle mounted lighting source. The VLS improves visibility at night for viewers or motorists thereby reducing accidents and damage costs, saves energy, and improves the environment and enhances quality of life by reducing light pollution and light trespass.

20 Claims, 3 Drawing Sheets

VARIABLE LIGHTING SYSTEM FOR OPTIMIZING NIGHT VISIBILITY

RELATED APPLICATION INFORMATION

This application is a continuation-in-part of U.S. patent application Ser. No. 11/179,956, filed Jul. 12, 2005, now abandoned the content of which is incorporated by reference herein as if set forth herein in full.

BACKGROUND OF THE INVENTION

1. Technical Field

This invention generally relates to lighting systems. Particularly, the invention relates to lighting systems for optimizing night visibility.

2. Description of Related Art

Night visibility is a well known concern of many individuals and is particularly a safety concern for night driving. As a result, artificial lighting such as street lights have been placed on roadways and in parking lots to improve night visibility for motorists. However, artificial lighting is not always sufficient for motorists and individuals so alternatives for improving night visibility have been established.

For example, one method for designing fixed roadway lighting promulgated by the American Standards Institute (ANSI) and Illuminating Engineering Society of North America (IESNA) is termed "Small Target Visibility" and is a method for maximizing the visibility of small (7 inch square) targets on a roadway. However, with this method all objects are still not detectable because there is not enough contrast between the object and background.

There is a desire to optimize headlamp and fixed roadway lighting system interactions to improve visibility. Other systems include aesthetic "under vehicle" lighting as well as variably aimed headlamps wherein both provide some assistance in detecting roadway hazards. These existing lighting systems, while beneficial, use large amounts of power and hence are costly. There is a need for a lighting system that further improves visibility at night on roadways and other artificially lit areas while also being cost effective.

SUMMARY OF THE INVENTION

The present invention solves the above-described problem by providing a variable lighting system ("VLS") for optimizing object visibility at night. The VLS varies the intensity of the variable lighting element to improve the contrast of objects. Contrast or luminance contrast is the relationship between the luminance of a brighter area of interest and that of an adjacent darker area. Mathematically, it is known as the Weber Contrast and is defined as the absolute value of difference between the two luminances divided by the lower luminance or $|(Lo-Lb)/Lb|$, with Lo typically representing the luminance of objects and Lb typically representing the luminance of the background.

Contrast sensitivity is the ability to discern between luminosities of different levels in a static image. Contrast sensitivity varies between individuals, maxing out at approximately 20 years of age, and at spatial frequencies of about 2-5 cycles/degree. In addition it can decline with age and other factors such as cataracts and diabetic retinopathy. A Contrast Threshold is the minimal amount of contrast, or difference between two shades of objects, needed in order to detect a pattern. Contrast threshold is measured by the number of photons a light stripe reflects in comparison to the number of photons reflected in a dark stripe. The contrast threshold is used to find the contrast sensitivity function, which is defined by taking the reciprocal of the contrast threshold.

In the prior art relative to fix roadway lighting, the contrast of the target and background is established by geometric factors does not change. Thus if an object is below the contrast threshold it will stay in the non-contrast threshold and be non-visible. For example, for a first certain location, such as between two light poles Lb, may be 1 candela/meter^2 while at a second location the background luminance may be 5 candela/meter^2. In the prior art, the intensity of the illumination on the object and the background is relatively constant and therefore, the contrast is relatively constant. Hence, the contrast may be acceptable for the first location but not for the second location. In the prior art, as a vehicle drives on a roadway with light poles, the vehicle is continually driving though positive contrast and negative contrast areas.

The VLS varies the intensity of the illumination on the object and background to vary the luminance of the object Lo and the background Lb so that the maximum available contrast for a person with average contrast sensitivity can be obtained at some point in the variable illumination cycle. The VLS comprises a variable lighting element, and a master synchronizer for synchronizing the timing and sequence of the variable lighting. The variable lighting element cycles through a range of lighting intensities so that any objects illuminated by the variable lighting element and the background will have a variable luminance. The luminance of the object, Lo, and the background Lb are varied such that a contrast above threshold can be obtained at every location along a roadway. It is understood that as the luminance is varied, an contrast below threshold may be obtained and the transition from the maximum contrast to the minimum contrast and the frequency of the maximum contrast (or minimum contrast) will depend on frequency that the intensity of the illumination varies. The contrast may be positive contrast where the Lo is greater than Lb or the contrast may be negative contrast where Lb is greater than Lo.

In one embodiment, a VLS is on two or more lighting fixtures such as light poles, street lamps, or indoor lighting and the varying intensity of the illumination from each VLS is synchronized to produce a maximum Weber Contrast. For example, a first VLS may have a high lighting intensity in the north direction and a second VLS may have a low lighting intensity in the south direction. Looking north, any objects illuminated by the first VLS would have a relatively high luminance Lo and the background luminance Lb from the second VLS would be relatively low thereby producing a relatively high Weber Contrast. Then each VLS cycles through a range of lighting intensities such that the first VLS may have a low lighting intensity in the north direction while the second VLS has a high lighting intensity in the south direction. Again looking north, any objects illuminated by the first VLS would have a relatively low luminance Lo and the background luminance Lb would be relatively high. Therefore, using the contrast formula $|(Lo-Lb)/Lb|$ the contrast would be relatively high.

In another embodiment, a VLS is on one or more lighting fixtures and vehicle contains a non-varying illumination source wherein the varying intensity of the illumination from each VLS is synchronized to product a maximum Weber Contrast. For example, as the vehicle is traveling north, the illumination source on the vehicle has a relatively high lighting intensity in the north direction so any objects would have a relatively high luminance Lo. The closest VLS on a lighting fixture would have a low lighting intensity in the south direction to produce a relatively low background luminance Lb and thereby produce a relatively high Weber Contrast.

Also, the closest VLS may have a low lighting intensity in the north direction while a second VLS north of the closest VLS to the vehicle would have a high lighting intensity in the south direction. The second VLS north of the closest VLS to the vehicle would be beyond the illumination range of the illumination source on the vehicle so any objects illuminated by the closest VLS would have a relatively low luminance Lo and the background luminance Lb produced by the second VLS north of the closest VLS to the vehicle would be relatively high. Then, to prevent a wash out, or the background luminance Lb matching the object luminance Lo, as the vehicle travels north and the illumination range of the illumination source on the vehicle approaches the second VLS, the lighting intensity in the south direction of the second VLS would decrease as the lighting intensity in the north direction would increase from the illumination source of the vehicle. In one embodiment, the vehicle contains a VLS and the VLS on the vehicle is synchronized with each VLS on the lighting fixture to produce a high Weber Contrast.

In another embodiment, at least one VLS is on a vehicle and as the vehicle travels, the intensity of the illumination is varied to obtain a maximum Weber Contrast. The vehicle with the VLS may contain a sensor that determines the luminance of the background and adjusts the intensity of the illumination from the VLS to obtain a maximum Weber Contrast. For example, if the vehicle is traveling north and the background luminance Lb is relatively low, then the illumination from the VLS on the vehicle would be relatively high such that any objects within the illumination range of the VLS would have a relatively high object luminance Lo thereby producing a relatively high Weber Contrast. Then, as the vehicle travels into an area where the background luminance Lb is relatively high, the illumination from the VLS on the vehicle would be relatively low such that any objects within the illumination range of the VLS would have a relatively low object luminance Lo thereby producing a relatively high Weber Contrast.

In one embodiment, the VLS varies the intensity and the color of the illumination on the object to vary the intensity and color of the luminance of the object Lo as well as the intensity and color of the background such that the maximum available contrast for a person with average contrast sensitivity can be obtained. In existing lighting systems, neither color or intensity changes and object luminance Lo and background luminance Lb remain constant and therefore the contrast does not change. If an object is in the non-visible region, it will stay in the non-visible region.

When color is added, the Weber Contrast formula becomes modified such that the contrast is now defined as |(Lo−Lb)/Lb|+the color contrast metric. The color contrast metric is difficult to quantify because the discriminability of pairs of colors depends on their differences in chrominance and luminance. While an entirely satisfactory metric does not exist that combines these attributes into a single assessment of total color difference, an estimate can be derived by calculating the weighted difference between the locations of the colors in the 1976 CIE UCS (CIE UCS $L^*u^*v^*$). In addition, the specification of small color differences should be treated with caution due to the inherent lack of color uniformity on most devices. Further information regarding the color contrast metric can be found at: American national standard for human factors engineering of visual display workstations, American National Standards Institute (1988) Santa Monica, Calif.: Human Factors and Ergonomics Society; A literature review and experimental plan for research on the display of information on matrix-addressable displays, Decker, J. J., Pigion, R. D., & Snyder, H. L. (1987) Blacksburg, Va.: Human Engineering Laboratory, VPI & SU; and Color contrast metrics for complex images, Post, D. L., & Snyder, H. L. (1986). Blacksburg, Va.: Human Factors Laboratory, VPI & SU (DTIC No. AD-A174960) all three of which are incorporated herein by reference.

In one embodiment, the system changes color and light intensity thereby providing a color contrast in addition to the Weber Contrast. The variation of intensity and color is designed to be quick enough to allow detection and reaction yet slow enough to be visually discrete to move the target into the visible range. In one embodiment, the variation is at least every 0.6 seconds.

In another embodiment, the VLS varies light intensity, color, and direction and optionally includes a detector for detecting motion, noise, or other occurrences. The VLS can be implemented as a fixed lighting source, a movable lighting source, or a vehicle mounted lighting source. The VLS improves visibility at night for all viewers, particularly bicycle riders, pedestrians, and motorists thereby reducing accidents and damage costs and saving lives. Furthermore when compared to known lighting systems, the VLS saves energy, improves the environment, and enhances quality of life by reducing light pollution and light trespass.

BRIEF DESCRIPTION OF DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Figure 1:
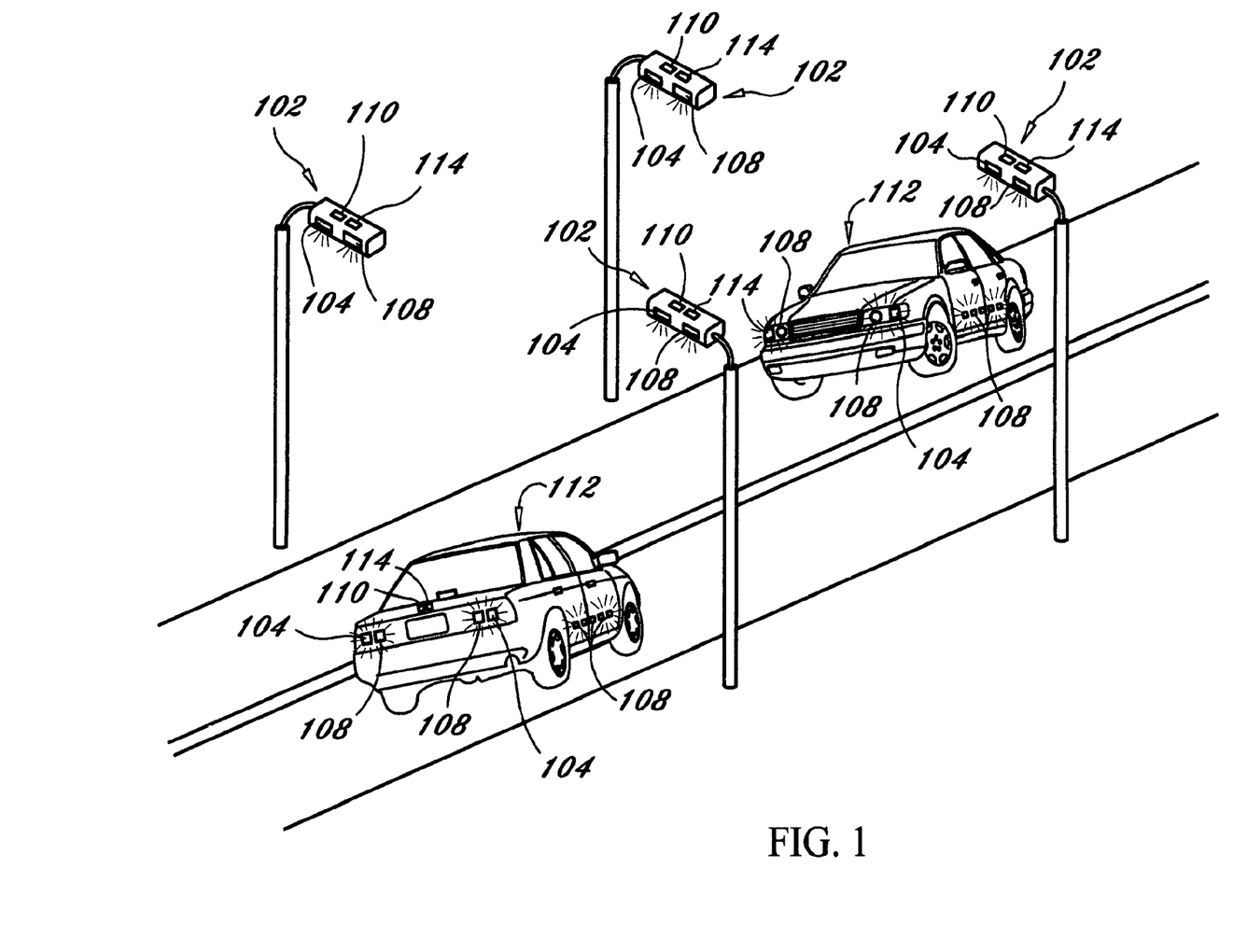
FIG. 1 is a perspective view illustrating the variable lighting system of the present invention.

FIG. 1 shows variable lighting system ("VLS") 102 for optimizing object visibility at night. VLS 102 contains variable lighting element 108 and synchronizer 110. Variable lighting element 108 is an illumination source and the illumination from variable lighting element 108 can be varied in any given direction. The direction of illumination may be in one direction, such as north, two directions such as north-south, or more such as north-east-south-west directions. For example, to vary the direction of illumination when using one light source and two directions, the variability is provided by an increase in the light intensity emitted in the northward direction, then a decrease in the intensity emitted northward with an increase in the intensity emitted in the southward direction, then a decrease in the intensity emitted southward which is followed by a repeat of the cycle again piecewise-continuously. The cycle frequency itself may be at a steady interval, such as every 0.5 seconds, or variable and can be any frequency greater than about 1/250th of a second, or the smallest amount of flicker the eye can detect. In one embodiment, the cycle frequency is about 0.5 seconds.

To vary the illumination from one illumination source in more than two directions, for example, north-east-southwest, the light intensity emitted by the source in the northward direction is increased; then the intensity in the northward direction is decreased and the intensity in the eastward direction is increased; then the intensity in the eastward direction is decreased and the intensity in the southward direction is increased; then the intensity in the southward direction is decreased and the intensity in the westward direction is increased; then the intensity in the westward direction is decreased and the intensity emitted northward is increased; and the cycle is then repeated piecewise-continuously. The cycle does not need to be continuously clockwise or counter-clockwise and may be in any order or sequence and may be variable. In addition, more than one direction may have the same intensity at any time. The length of the "on," "off," "increase," or "decrease" cycle of any direction need not be the same as other directions "on," "off," "increase," or "decrease" cycle times and may also be variable in any and all directions. The cycle frequency itself may be at a steady interval, such as every 0.5 seconds, or variable and can be any frequency greater than about 1/250th second, or the amount of flicker the eye can detect. In one embodiment, the cycle frequency is about 0.5 seconds.

Variable lighting element 108 varies the intensity of the illumination on the object and background to vary the luminance of the object Lo and the background Lb so that the maximum available contrast for a person with average contrast sensitivity can be obtained at some point in the variable illumination cycle. Contrast or luminance contrast is the relationship between the luminance of a brighter area of interest and that of an adjacent darker area. Mathematically, it is known as the Weber Contrast and is defined as the absolute value of difference between the two luminances divided by the lower luminance or |(Lo−Lb)/Lb|, with Lo typically representing the luminance of objects and Lb typically representing the luminance of the background.

Variable lighting element 108 cycles through a range of lighting intensities so that any objects illuminated by the variable lighting element will have a variable luminance. The luminance of the object, Lo, is varied such that an acceptable contrast can be obtained whatever the background luminance may be. It is understood that as the luminance is varied, an unacceptable contrast will be obtained and the transition from the maximum acceptable contrast to the maximum unacceptable contrast and the frequency of the maximum acceptable contrast (or minimum acceptable contrast) will depend on frequency that the intensity varies. The contrast may be light contrast where the Lo is greater than Lb or the contrast may be dark contrast where Lb is greater than Lo.

In one embodiment, VLS 102 is on two or more lighting fixtures such as light poles, street lamps, or indoor lighting. The varying intensity of the illumination from each variable lighting element 108 on each VLS 102 is synchronized to produce a maximum Weber Contrast. For example, a first VLS 102 may have a high lighting intensity in the north direction and a second VLS 102 may have a low lighting intensity in the south direction. Looking north, any objects illuminated by first VLS 102 would have a relatively high luminance Lo and a relatively low background luminance Lb would be provided by second VLS 102, thereby producing a relatively high Weber Contrast. Then each VLS 102 cycles through a range of lighting intensities such that the first VLS 102 may have a low lighting intensity in the north direction while the second VLS 102 has a high lighting intensity in the south direction. Again looking north, any objects illuminated by the first VLS would have a relatively low luminance Lo and a relatively high background luminance Lb provided by second VLS 102, thereby, using the contrast formula |(Lo−Lb)/Lb|, the Weber Contrast would be relatively high.

In another embodiment, a VLS 102 is on one or more lighting fixtures and vehicle 112 contains non-varying illumination source 104. In one embodiment, illumination source 104 is headlights. In another embodiment, illumination source 104 is a combination of headlights or other light sources in the front of, rear lights sources in the back of, and light sources such as LEDs or other light sources on the side of vehicle 112. The varying intensity of the illumination from each variable lighting element 108 on each VLS 102 is synchronized to product a maximum Weber Contrast. For example, as vehicle 112 is traveling north, illumination source 104 on vehicle 112 has a relatively high lighting intensity in the north direction so any objects illuminated by illumination source 104 on vehicle 112 would have a relatively high luminance Lo. The variable lighting element 108 on the VLS 102 that is north and closest to vehicle 112 would have a low lighting intensity in the south direction to produce a relatively low background luminance Lb and thereby produce a relatively high Weber Contrast.

Also, the closest variable lighting element 108 to vehicle 112 may have a low lighting intensity in the north direction while a second variable lighting element 108 on a VLS 102 north of the closest VLS 102 to vehicle 112 would have a high lighting intensity in the south direction. The second VLS 102 that is north of the VLS 102 closest to vehicle 112 would be beyond the illumination range of illumination source 104 on vehicle 112 so any objects illuminated by variable lighting element 108 on the closest VLS 102 would have a relatively low luminance Lo and the background luminance Lb produced by the second variable lighting element 108 on the VLS 102 north of the closest VLS 102 to vehicle 112 would be relatively high. Then, to prevent a wash out, or the background luminance Lb matching the object luminance Lo, as vehicle 112 travels north and the illumination range of illumination source 104 approaches the second VLS 102, the lighting intensity of variable lighting element 108 on the second VLS 102 in the south direction would decrease as the lighting intensity in the north direction would increase from the illumination source of vehicle 112. In one embodiment, vehicle 112 contains at least one variable lighting element 108 and variable lighting element 108 on the vehicle 112 is synchronized with each VLS 102 on the lighting fixture to produce a high Weber Contrast.

In another embodiment, at least one variable lighting element 108 is on vehicle 112 and as vehicle 112 travels, the intensity of the illumination is varied to obtain a maximum Weber Contrast. In one embodiment, vehicle 112 contains sensor 114 that determines the luminance of the background and adjust the intensity of the illumination from at least one variable lighting element 108 to obtain a maximum Weber Contrast. For example, if vehicle 112 is traveling north and the background luminance Lb is relatively low, then the illumination from at least one variable lighting element 108 on vehicle 112 would be relatively high such that any objects within the illumination range of at least one variable lighting element 108 would have a relatively high object luminance Lo thereby producing a relatively high Weber Contrast. Then, as vehicle 112 travels into an area where the background luminance Lb is relatively high, the illumination from at least one variable lighting element 108 on vehicle 112 would be relatively low such that any objects within the illumination range of at least one variable lighting element 108 would have a relatively low object luminance Lo thereby producing a relatively high Weber Contrast.

In another embodiment, vehicle 112 contains a side and/or rear mounted variable lighting element 108. The side and/or rear mounted variable lighting element 108 may be almost any intensity that is safe for the environment it is being used in. Compared to headlamps which illuminate only in the front, but not necessarily toward the roadway, the illumination from the side and/or rear mounted variable lighting element 108 may be emitted toward the roadway or any other direction away from vehicle 112 and may be variable. For example, as the speed increases, the illumination may be directed further away from vehicle 112 and as vehicle 112 decelerates the illumination may be directed closer to vehicle 112 towards the roadway. Variable lighting element 108 may also be at least partially directed towards vehicle 112 to illuminate vehicle 112. The side and rear mounted variable lighting element 108 provide visibility of objects for others outside vehicle 112 such as other motorists, pedestrians, cyclists, cameras, or other vehicle detectors and to also improve the visibility and identity of the vehicle itself.

Each VLS 102 also comprises synchronizer 110. Synchronizer 110 coordinates the timing and sequence of all variable lighting element 108 on each VLS 102. Synchronizer 110 provides a timing coordination signal so that directional variability and intensity from each variable lighting element 108 may work together in harmony so that each variable lighting element 108 will increase or decrease intensity to create the maximum available Weber Contrast.

Synchronizer 110 may generate timing signals to coordinate the timing and sequence of the lighting intensity and direction of illumination from variable lighting element 108. Each synchronizer 110 contains a clock that is synchronized with a standard timing device or another synchronizer 110 in the area. The standard timing device may be any standard timing device known in the art or may be the AC sine wave located on every power line and generated from the electrical plant supplying electricity to the area. To synchronize the clocks, the frequency of the sine wave is measured and used to create a standard of time. Any other device that can access the sine wave can use the sine wave to create the same standard of time.

The sequence of the lighting intensity and direction of illumination from variable lighting element 108 is preprogrammed in each VLS 102 and may be hardwired or rewritable. In one embodiment, synchronizer 110 may overridden by detector 114 such as if detector 114 is on vehicle 112 or a street lamp and is measuring the background luminance Lb and overrides synchronizer 110 to produce the maximum available Weber Contrast.

In one embodiment, synchronizer 110 emits a wireless synchronization signal to objects such as vehicles or other components not connected to the standard timing device so that any VLS 102 that cannot access the standard timing device can be synchronized with any other VLS 102 in the vicinity. In addition, synchronizer 110 emits a timing signal that includes the sequence of the lighting intensity and direction of illumination from variable lighting element 108. Also, all synchronizers 110 are equipped with priority codes so that one synchronizer acts as a master synchronizer for a given area and the wireless synchronization signal and timing signal are used by all the VLS 102 in the area.

In one embodiment, VLS 102 varies the intensity and the color of the illumination on the object to vary the intensity and color of the luminance of the object Lo as well as the intensity and color of the background such that the maximum available contrast for a person with average contrast sensitivity can be obtained. When color is added, the Weber Contrast formula becomes modified such that the contrast is now defined as |(Lo−Lb)/Lb|+the color contrast metric. VLS 102 changes color and light intensity thereby providing a color contrast in addition to the Weber Contrast. The variation of intensity and color is designed to be quick enough to allow detection and reaction yet slow enough to be visually discrete to move the target into the visible range. In one embodiment, the variation is at least every 0.6 seconds. In another embodiment, vehicle 112 contains sensor 114 that determines the intensity and color of the background luminance and adjust the intensity and color of the illumination from at least one variable lighting element 108 to obtain an object luminance that will give a maximum Weber Contrast and color contrast metric.

The light emitted in a given direction may be any color or a combination of colors. For example, red light may be emitted northward, then dimmed and then green light increasingly emitted northward as the red light is dimmed and then the red light increasingly emitted northward as the green light is dimmed. Also, similar light patterns may be emitted southward either at the same time or at a subsequent time period synchronized with the light that is being emitted in another direction. For example, red light may be emitted northward while green light is emitted southward. Then the northward red light is dimmed and green light is increasingly emitted northward while the green southward light is dimmed and the red light is increasingly emitted southward. The variable lighting system of the above example provides a varying color and intensity contrast of red and green. This will provide better contrast compared to the method of intensity contrast, thereby increasing visibility. The color emitted north and south is typically not the same color at the same time. In one embodiment, the emitted colors are complimentary colors.

A similar cycle may occur if more than two directions and/or more than two colors are used. For example, a red light may be emitted northward, a blue light eastward, a green light southward, and a yellow light westward. Then the red light is dimmed and the blue light is increasingly emitted northward while the blue eastward light is dimmed, the green light is increasingly emitted eastward while the green southward light is dimmed, the yellow light is increasingly emitted southward while the yellow westward light is dimmed, and the red light is increasingly emitted westward. The general cycle is repeated piecewise-continuously. The cycle does not need to be continuously clockwise or counterclockwise and may be in any order or sequence and may be variable. Also, more than one color may be emitted at one time. The length of the "on," "off," "increase," or "decrease" cycle of any direction need not be the same as other directions "on," "off," "increase," or "decrease" cycle times and may also be variable. The cycle frequency itself may be at a steady interval, such as every 0.5 seconds, or variable and can be any frequency greater than approximately 1/250th second, or the amount of flicker the eye can detect. Preferably, the cycle frequency is about 0.5 seconds. In one embodiment, only even numbered directions are used, such as two, four, six, or eight. In another embodiment, each VLS is coordinated such that the color illuminating an object is a complement of the background color to increase contrast.

Synchronizer 110 provides a timing coordination signal so that directional variability for each color and intensity from each variable lighting element 108 may work together in harmony so each variable lighting element 108 will increase or decrease intensity and change color to create the maximum available Weber Contrast and color contrast metric.

Synchronizer 110 may generate timing signals to coordinate the timing and sequence of the lighting intensity, color, and direction of illumination from variable lighting element 108. In one embodiment, synchronizer 110 emits a timing signal that includes the sequence of the lighting intensity, color, and direction of illumination from illumination source 104 and variable lighting element 108.

In another embodiment, VLS 102 includes illumination source 104, variable lighting element 108, and may contain synchronizer 110. The illumination range of base element 104 can range from zero to 100 million candle power and may be variable. Preferably the minimum illumination level is the lowest illumination detectable by the human eye based on the surrounding environment and the maximum illumination level is the maximum amount of illumination that would be safe for the surrounding environment. Illumination source 104 can be configured to consist of light energy in one, a portion of, or all of the visible wavelengths (anything from mono-chromatic to white light). In addition to the illumination from illumination source 104, if any, variable lighting element 108 adds varying amounts of illumination, color, and/or light direction.

VLS 102 may be implemented as fixed lighting sources or a mobile lighting source. Fixed lighting sources include lights on street light poles, in parking lots or on buildings. Mobile VLS 104 includes any VLS mounted on mobile source such as vehicle 112. In one embodiment, vehicle 112 mounted VLS 102 includes at least one illumination source 104 and at least one variable lighting element 108. One illumination source 104 and/or one variable lighting element 108 may be mounted on the front of vehicle 112 similar to headlamps. The at least one illumination source 104 and at least one variable lighting element 108 may be mounted on the side and/or rear of vehicle 112.

In one embodiment, synchronizer 110 on vehicle 112 synchronizes the lighting system of vehicle 112 by using any available standard timing device or the wireless synchronization signal emitted from synchronizer 110 of VLS 102. The standard timing device is static and typically will have priority over the wireless synchronization signal. Exceptions to the priority may include emergency vehicles or other special events.

In the case of an emergency vehicle or other special event, the emergency vehicle or some other source will send a priority signal that will override the lighting pattern of VLS 102 and variable lighting element 108. For example, if a police car or fire engine is speeding to an accident or fire, then all static VLS 102 within a two-block radius may flash a red light. Also, all variable lighting elements 108 in the direction of the speeding car or fire engine may flash their lights. This would alert all drivers and pedestrians that a police or fire engine is in their area and the drivers and pedestrians should take the appropriate action.

Figure 2:
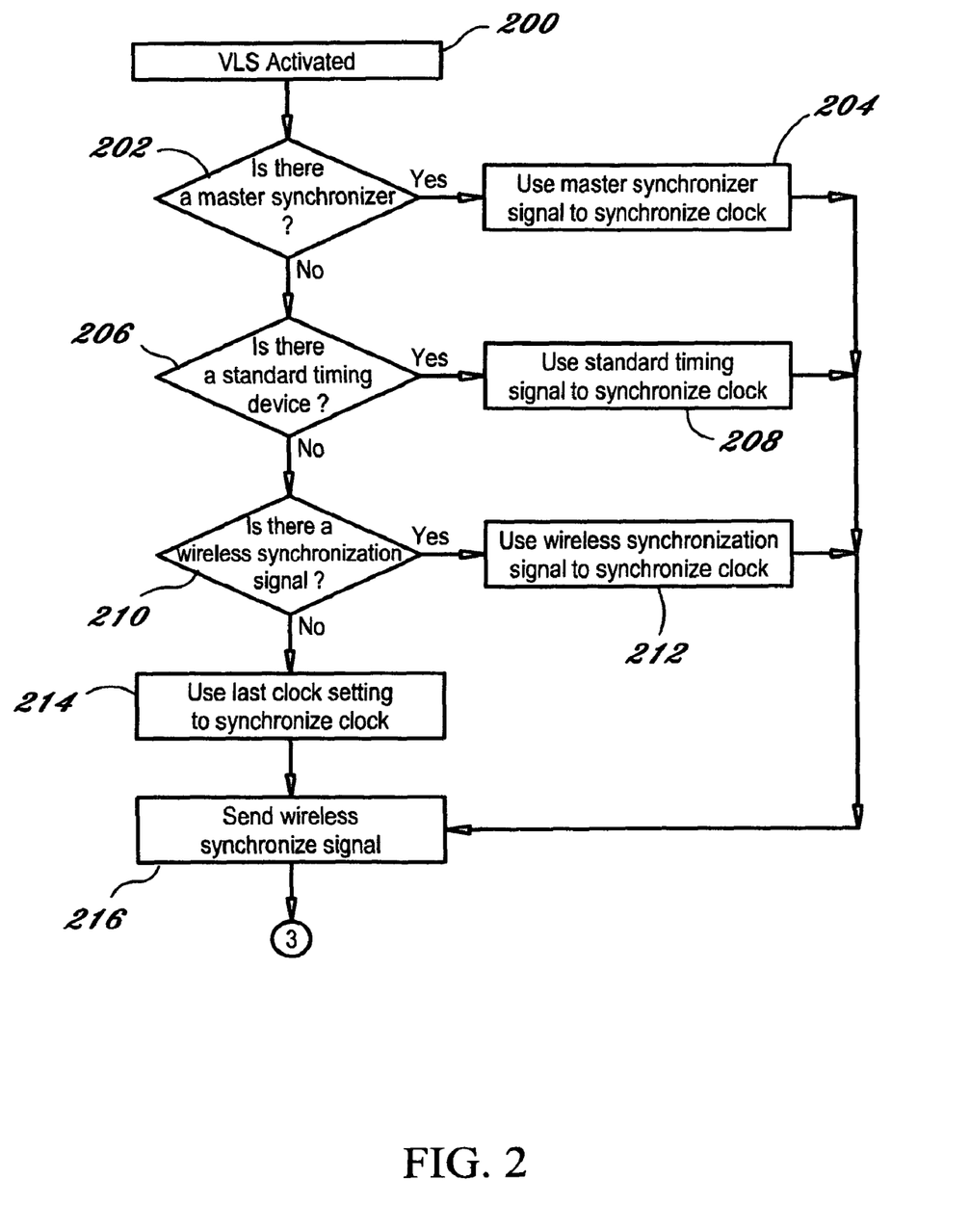
FIG. 2 is a flow chart depicting the steps involved in synchronizing the clock of the present invention.

FIG. 2 depicts a method of using the VLS 102. When the VLS 102 is first activated, Step 200, the synchronizer 110 checks to determine if there is a master synchronizer 110 to synchronizes the clock in the synchronizer 110, Step 202. If there is a master synchronizer 110, the synchronizer 110 uses the master synchronizer 110 to synchronize its clock, Step 204. If there is not a master synchronizer 110, the synchronizer 110 checks to determine if there is a standard timing device to synchronizes the clocks in the synchronizer 110, Step 206. If there is a standard timing device, such as the AC sine wave described above, the synchronizer 110 uses the master or standard timing device to synchronize its clock, Step 208. If there is not a standard timing device, then the synchronizer 110 determines if there is a lower priority synchronization signal such as a wireless synchronization signal from a synchronizer 110 that is not a master synchronizer 110, Step 210. If there is a lower priority synchronization signal, the synchronizer 110 uses that synchronization signal to synchronize its clock, Step 212. Steps 202 through 212 allow all the clocks of any VLS 102 within a given area to be to be synchronized. If there is not a lower priority synchronization signal, then the synchronizer 110 uses the last clock setting available, such as a factory clock setting or the last synchronized clock setting, Step 214. After the clock is synchronized, the synchronizer 110 sends out a wireless synchronization signal, Step 216.

Figure 3:
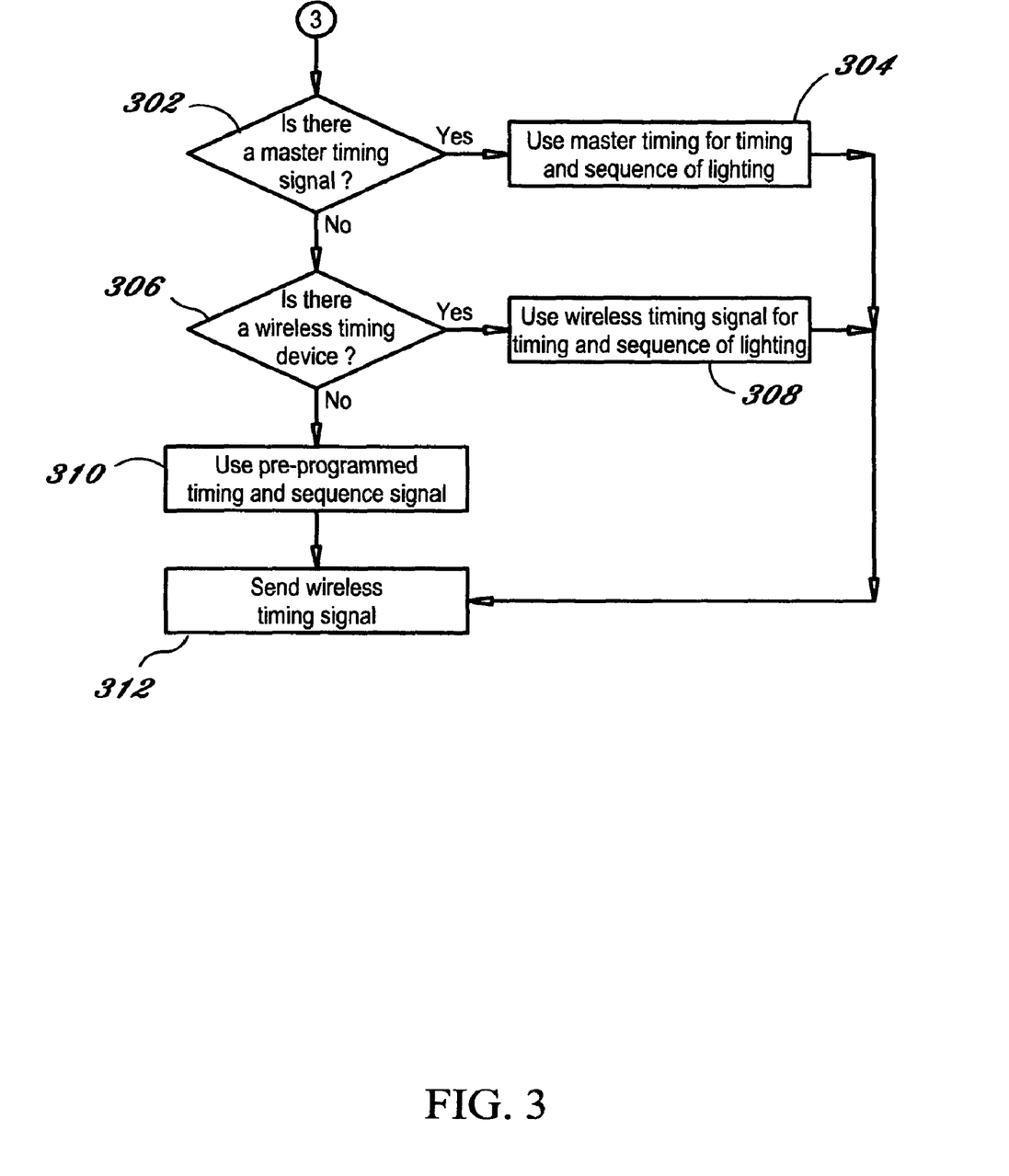
FIG. 3 is a flow chart depicting the steps involved in synchronizing the timing sequence of the present invention.

Next, as shown in FIG. 3, the synchronizer 110 checks to determine if there is a master timing signal from a master synchronizer 110 to synchronizes the timing and sequence of the lighting intensity, color, and direction of illumination from illumination source 104 and variable lighting element 108, Step 302. If there is a master timing signal, the synchronizer 110 uses the master timing signal to synchronize the timing and sequence of the lighting intensity, color, and direction of illumination from illumination source 104 and variable lighting element 108, Step 304. If there is not a master timing signal, the synchronizer 110 checks to determine if there is a lower priority timing signal such as a wireless timing signal from a synchronizer 110 that is not a master synchronizer 110, Step 306. If there is a lower priority timing signal, synchronizer 110 uses that timing signal to synchronize the timing and sequence of the lighting intensity, color, and direction of illumination from illumination source 104 and variable lighting element 108, Step 308. Steps 302 through 308 allow all the timing and sequence of the lighting intensity, color, and direction of illumination from illumination source 104 and variable lighting element 108 for each VLS 102 within a given area to be to be synchronized. If there is not a lower priority timing signal, then the synchronizer 110 uses the preprogrammed timing signal for the timing and sequence of the lighting intensity, color, and direction of illumination from illumination source 104 and variable lighting element 108. After the timing sequence is established, the synchronizer 110 sends out a wireless timing signal, Step 312.

For example, vehicles driving in the north direction may receive a timing signal to emit blue lights at a frequency of 0.5 seconds northward and vehicles traveling in the south direction may receive a timing signal to emit green light at a frequency of 0.5 seconds southward. The lighting difference provides the increased contrast necessary to see more objects in the roadway.

A vehicle mounted variable lighting element 108 may be programmed such that if no other vehicle is within a predetermined range, such as approximately 1000 to 1500 feet, then no side and rear vehicle lighting is emitted. The range may be established by the detection of a wireless signal from detector 114.

In one embodiment, detector 114 can also detect a predetermined signal such as one from an emergency vehicle, motion detector, noise detector, distress signal, traffic signal, or other unrelated occurrence. If the detector is activated, the VLS 110 may noticeably modify the light emission to produce a flash, flash red, or other color, or produce some other noticeable change. The VLS 102 response to a predetermined signal may vary with the source of signal. For example, the VLS 102 may produce a red tint appearance when a traffic signal ahead is red, red flash overtones when an emergency vehicle is nearby, or flash yellow overtone when a lane is closed or other trouble is ahead. Also, fixed lighting may be turned off or dimmed when no vehicles are present or are not in close enough proximity to be of sufficient value to warrant the illumination. This could save on the overall cost of operating a fixed lighting system.

Preferred forms of the invention have been shown in the drawings and described above, but variations in the preferred forms will be apparent to those skilled in the art. For example, the VLS 102 may be used inside a building. The preceding description is for illustration purposes only, and the invention should not be construed as limited to the specific form shown and described. The scope of the invention should be limited only by the language of the following claims.

What is claimed is:

1. A method for optimizing nighttime visibility of objects on a roadway or path, the method comprising the steps of:
    activating at least two variable lighting elements in a continuous synchronized relationship wherein a first variable lighting element is a street light and provides object luminance (Lo) to an object on the ground and a second variable light element provides background luminance (Lb); and
    synchronizing the timing and sequence of intensity of each variable lighting element with the other variable lighting element to optimize the Weber Contrast ($|(Lo-Lb)/Lb|$) of the object on the ground, wherein in a first cycle, the first variable lighting element has a relatively high lighting intensity in a first direction and the second variable lighting element has a relatively low lighting intensity in a second direction, wherein the first direction is opposite the second direction, and in a second cycle, the first variable lighting element has a relatively low lighting intensity in the first direction and the second variable lighting element has a relatively high lighting intensity in the second direction.

2. The method of claim 1 wherein the at least two variable lighting elements each contain at least one variable illumination source and each variable illumination source can vary the intensity of illumination on an object to provide object luminance or on the background to provide background luminance.

3. The method of claim 1 wherein each variable lighting element contains a timing device to synchronizing the timing and sequence of activation and deactivation of each variable illumination source and the timing device generates a synchronization signal that is received by a second variable lighting element and the second variable lighting element uses the synchronization signal to synchronize the activation and deactivation of each variable illumination source.

4. The method of claim 3 wherein the timing device is a master timing device and generates a synchronization signal to be received by a slave timing device and the slave timing device uses the synchronization signal to synchronize the variation cycle.

5. The method of claim 2 further comprising the step of activating at least one base lighting element wherein the base lighting element provides illumination on the object to provide a portion of the object luminance or on the background to provide a portion of the background luminance.

6. The method of claim 2 further comprising the step of activating a background luminance detector wherein the detector determines the background luminance and adjusts the intensity and direction of illumination on an object to provide the object luminance that will give the highest Weber Contrast.

7. The method of claim 2 wherein each variable lighting element can vary the intensity and color of illumination on the object to provide object luminance or background to provide background luminance wherein the color contrast metric adds to the Weber Contrast.

8. The method of claim 7 wherein the illumination color on an object to provide object luminance is a complement of the color of the background luminance.

9. The method of claim 7 further comprising the step of activating a background luminance detector wherein the detector determines the background luminance intensity and color and adjusts the intensity, color, and direction of illumination on an object to obtain the object luminance that will give the highest Weber Constant and color contrast metric.

10. The method of claim 7 wherein at least one variable lighting element is attached to a vehicle.

11. The method of claim 2 wherein the at least one variable lighting element further comprises a detector that emits a signal to activate at least one variable illumination source, wherein the detector is configured for detecting motion, noise, presence, proximity, or combinations thereof.

12. A variable lighting system for optimizing night visibility of objects on a roadway or path comprising:
    at least two variable lighting elements, each lighting element having at least one variable illumination source wherein each variable illumination source is positioned to illuminate a roadway or path and can activated and deactivated in a continuous synchronized frequency cycle or loop to vary the intensity and color of illumination on an object on the roadway or path to provide object luminance or on the background to provide background luminance, and
    synchronizing the timing and sequence of activation and deactivation of a first variable lighting element with a second variable lighting element is used to optimize the Weber Contrast and color contrast metric, wherein in a first cycle, the first variable lighting element has a relatively high lighting intensity in a first direction and the second variable lighting element has a relatively low lighting intensity in a second direction, wherein the first direction is opposite the second direction, and in a second cycle, the first variable lighting element has a relatively low lighting intensity in the first direction and the second variable lighting element has a relatively high lighting intensity in the second direction.

13. The variable lighting system of claim 12 wherein each variable lighting element contains a timing device to synchronizing the timing and sequence of activation and deactivation of each variable illumination source and the timing device generates a synchronization signal that is received by the second variable lighting element and the second variable lighting element uses the synchronization signal to synchronize the activation and deactivation of each variable illumination source.

14. The variable lighting system of claim 13 wherein the timing device is a master timing device and generates a synchronization signal to be received by a slave timing device and the slave timing device uses the synchronization signal to synchronize the frequency cycle or loop.

15. The variable lighting system of claim 12 wherein the illumination color on an object to provide object luminance is a complement of the color of the background luminance.

16. The variable lighting system of claim 12 further comprising a background luminance detector wherein the detector determines the background luminance intensity and color and adjusts the intensity, color, and direction of illumination on an object to obtain the object luminance that will give the highest Weber Contrast and color contrast metric.

17. The variable lighting system of claim 12 wherein at least one variable lighting element is attached to a vehicle.

18. The variable lighting system of claim 12 further comprising at least one base lighting element wherein the base lighting element provides illumination on the object to provide a portion of the object luminance or on the background to provide a portion of the background luminance.

19. A method for optimizing nighttime visibility of objects on a roadway or path, the method comprising the steps of:
   activating at least two variable lighting elements wherein each variable lighting element contains at least one variable illumination source and each variable illumination source can vary the intensity, color and direction of illumination;
   activating each variable illumination source in a continuous synchronized relationship wherein a first variable lighting element provides object luminance and a second variable light element provides background luminance;
   synchronizing the timing and sequence of activation and deactivation of each variable illumination source with the other variable lighting element to optimize the Weber Contrast and color contrast metric; and
   activating a timing device to synchronize the timing and sequence of activation and deactivation of each variable illumination source and the timing device generates a synchronization signal that is received by a second variable lighting element and the second variable lighting element uses the synchronization signal to synchronize the activation and deactivation of each variable illumination source, wherein in a first cycle, the first variable lighting element has a relatively high lighting intensity in a first direction and the second variable lighting element has a relatively low lighting intensity in a second direction, wherein the first direction is opposite the second direction, and in a second cycle, the first variable lighting element has a relatively low lighting intensity in the first direction and the second variable lighting element has a relatively high lighting intensity in the second direction.

20. The method of claim 19 further comprising the step of activating a background luminance detector wherein the detector determines the background luminance intensity and color and adjusts the intensity, color, and direction of illumination on an object to obtain the object luminance that will give the highest Weber Contrast and color contrast metric.

* * * * *